METHOD OF IDENTIFYING CONDUCTORS IN A CABLE BY ESTABLISHING CONDUCTOR CONNECTION GROUPINGS AT BOTH ENDS OF THE CABLE

Filed Oct. 15, 1965 5 Sheets-Sheet 1

R.L. GRAHAM
K.C. KNOWLTON
BY John K. Mullarney
ATTORNEY

METHOD OF IDENTIFYING CONDUCTORS IN A CABLE BY ESTABLISHING CONDUCTOR CONNECTION GROUPINGS AT BOTH ENDS OF THE CABLE

Filed Oct. 15, 1965 5 Sheets-Sheet 2

3,369,177

METHOD OF IDENTIFYING CONDUCTORS IN A CABLE BY ESTABLISHING CONDUCTOR CONNECTION GROUPINGS AT BOTH ENDS OF THE CABLE

Ronald L. Graham, Madison, and Kenneth C. Knowlton, Plainfield, N.J., assignors to Bell Telephone Laboratories, Incorporated, New York, N.Y., a corporation of New York Filed Oct. 15, 1965, Ser. No. 496,423
8 Claims. (Cl. 324—66)

This invention relates to the identification of conductors in a multiconductor cable and, more particularly, to a novel method for identifying the conductors in a cable by selected conductor connections at the ends of the cable.

A telephone cable, used to connect subscribers from some remote location to a central office, is generally made up of a large number of insulated conductors all contained within a single protective sheath. Each conductor terminates at a particular terminal on a main frame at the central office and is connected to some handset of a particular subscriber at some remote field location. Each conductor at the remote end of the cable in the field location must be identified in terms of its corresponding connection at its near end to the main frame at the central office.

The most prevalent method of manually identifying conductors utilizes two workmen stationed, respectively, at the central office or near end of the cable and the remote end of the cable. The man in the central office sequentially applies an audible signal to each of the conductors. He communicates the identity of each energized conductor to a man at the remote end of one cable at the time the signal is applied. The man at the remote end has an electrical probe connected to an audio detector. As the man at the remote end is informed as to the identity of an energized conductor, he manually scans the conductors of the cable to find the energized one. When he locates the energized conductor, he puts an identification tag on it and notifies the man at the near end, who then applies the audible signal to another unidentified conductor. This procedure is continued until all of the conductors have been identified. Apparatus suitable for use in this type of identification is disclosed, for instance, in the Fisher-Parker Patent 2,133,384, issued Oct. 18, 1938.

In addition to the aforementioned manual method there also presently exist identification systems that utilize automated apparatus which permit a single operator to identify the conductors in a multiconductor cable. Such systems may, for instance, permit an operator at the remote end of the cable to remotely control the selection of a conductor to which an audible signal is applied at the central office. The operator then manually scans the conductors to locate the signal. Such a system is shown, for instance, in the Meanly Patent 2,806,995, issued Sept. 17, 1957. There are other systems utilizing fully automated apparatus wherein signals are applied at the near end of the cable in an orderly time sequence and the energized conductors are identified at the remote end of the cable according to the time slot or period in which they are energized. Such a system is shown, for instance, in the pending application of C. E. Bohnenblust, Ser. No. 315,128, now Patent No. 3,288,943, filed Oct. 10, 1963.

In still other fully automatic systems coded signals are simultaneously applied to all the conductors at the near end, each individual conductor at the remote end then being identified by the unique code it transmits.

In the above-described prior art arrangements of conductor identification the manual method used is usually too slow and cumbersome and requires the operator to perform a large number of individual steps. The automatic apparatus, on the other hand, while faster and often more accurate, generally requires fairly complicated equipment which is expensive to acquire and maintain. The present invention, in contrast, provides a method of identifying individual conductors in a multiconductor cable which is faster and more accurate than prior art manual methods and yet requires only simple equipment and a minimum of effort on the part of the workman.

It is therefore an object of the present invention to reduce the time consumed and improve the efficiency of conductor identification without the need of complex equipment.

It is another object of the present invention to permit the identification of conductors by a single operator with a single set of tests and connections at each end of the cable.

It is yet another object of the present invention to identify conductors with a bare minimum of manual operations.

In accordance with the present invention, each of the conductors at the near end of a multiconductor cable having $n$ conductors is assigned a unique integer selected from a set of $n$ consecutive integers. The integers of the set are subdivided into a series of subsets containing different ones of the integers. This initial grouping of the set of integers into various subsets is called a normal partition. A complement of the normal partition is then derived by grouping the same integers into different ones of the same subsets. The conductors at the near end of the cable are connected to various common nodes according to the integer grouping of the subsets of the normal partition. Now by testing for circuit continuity at the remote end of the cable, the subsets of conductors connected together at the near end are determined. These conductors at the remote end are labeled arbitrarily but in accordance with the normal partition. The conductors at the remote end are then connected to various common nodes according to the integer grouping of the complementary partition. The original connections at the near end are removed and by testing the conductors there for circuit continuity the subsets of the conductor groupings at the remote end of the cable are determined. By comparing the subsets of the cable connections at the two ends of the cable with the occurrence of integers in various subsets of the normal and complementary partition, each individual conductor is uniquely identified.

Other objects and advantages of the invention will become apparent by reference to the following description when considered in connection with the accompanying drawings, wherein.

Figure 1B:
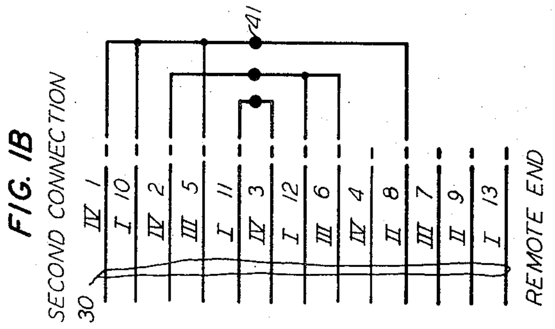
FIGS. 1A and 1B are schematic drawings of a multiconductor cable and the connections made thereto to identify its numerous conductors.
Figure 1A:
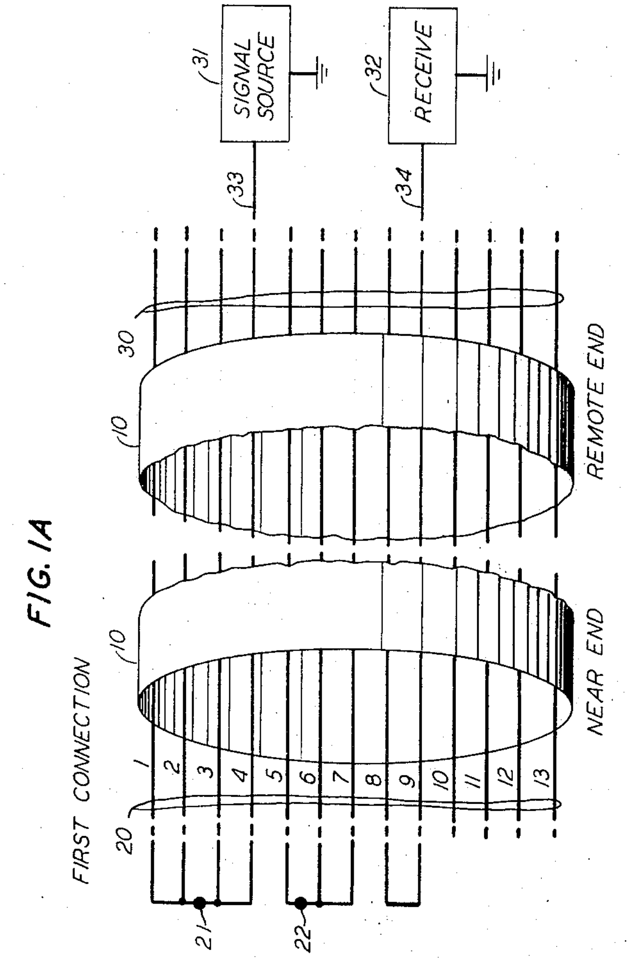

Referring now to FIG. 1A, a multiconductor cable 10 is shown wherein the identity of the individual conductors is to be determined at the remote end. The conductors at the near end are connected to a main frame at the central office, which is not shown. Each of the conductors 20 at the central office, or near end, is for illustrative purposes assigned an integer from the set of consecutive integers $I_1, I_2, I_3, I_4 \ldots I_n$. This assignment is not essential to the identification method, but will assist in demonstrating the method. For illustrative purposes, the cable is shown with thirteen conductors (i.e., $n=13$), however, it is to be understood that this method is more typically applicable to a cable having a great many more conductors, the exact number of the latter being of no consequence insofar as the present inventive method is concerned.

The set of integers $I_1, I_2 \ldots I_n$, which equals the number of conductors, is subdivided into normal and complementary partitions. A partition is the grouping of the integers of a set into subsets. Partitions are complementary when each subset in each partition has no like pairings of integers. The partitions may be selected from a table of partitions derived for this purpose, or they may be derived by mapping techniques as needed. A preferred derivation of partitions for a given set of integers will be explained subsequently.

As will be apparent hereinafter, a normal partition P and its complement P′ for the set of integers $I_1, I_2 \ldots I_n$ where $n=13$ is:

$$P=(1,2,3,4)(5,6,7)(8,9)(10)(11)(12)(13) \quad (1)$$

$$P'=(1,5,8,10)(2,6,12)(3,11)(4)(7)(9)(13) \quad (2)$$

The conductors 20 at the near end are joined together at selected common nodes in accordance with the partition P. For instance, the conductors having the assigned integers 1, 2, 3 and 4 are joined to a first common node 21; the conductors having the assigned integers 5, 6, and 7 are joined to a second common node 22, and so on. The conductors having assigned integers, such as 10 which exist in a subset having only one integer are left unconnected.

The unidentified conductors 30 at the remote end of the cable are tested to determine which subsets of the conductors are joined by the common nodes at the near end and which conductors are not so joined. This testing for continuity may be conducted by applying a signal to one conductor and probing the other conductors to determine which if any of them are energized. For instance, a signal may be applied to conductor 33 in FIG. 1A and the signal is detected on conductor 34 only. Therefore, it is evident that conductor 33 at the remote end belongs to a subset having two conductors. Such testing equipment may comprise a signal source 31 and a receiver 32. The construction of such signaling apparatus and the associated connecting probes to energize and scan the conductors are well known in the telephone art and its is not believed necessary to disclose the same in detail. A suitable probe, for instance, is disclosed in R. M. Scarlett Patent 3,181,062, issued Apr. 27, 1965.

Having determined by the aforementioned continuity testing the various subsets to which the conductors at the remote end belong, the conductors belonging to each subset are assigned integers belonging to the same subset of the partition P. For example, the four conductors at the far end found to be joined at the near end will be assigned the integers 1, 2, 3, and 4, although the assignments are not necessarily to the very same conductors that have these same assigned integers at the near end. The conductors in the subsets with only one integer are assigned the integers which are assigned to unconnected conductors at the near end. The subsets of the conductors at the remote end is shown in FIG. 1B with the Roman numerals I, II, III, and IV indicating the number of conductors assumed joined to each at the near end. The conductor integers are assigned according to this subset determination.

Using the assigned integers at the remote end, the conductors 330, as shown in FIG. 1B, are now connected together at selected common nodes in accordance with the integer subsets of the complementary partition P′. For example, the conductors assigned the integers 1, 5, 8, and 10 will be joined to the common node 41, and so on.

The connections originally made at the near end are disconnected and circuit continuity tests are conducted at the rear end to determine which wires at the remote end are connected together. These continuity tests are identical to the above-described continuity tests performed at the remote end. This operation completes the manual steps needed to uniquely identify each conductor.

The unique identification of each individual conductor is completed by comparing the respective locations of the assigned integers in the subsets of the normal and complementary partitions. The identification of each conductor is unique because each subset in the normal and complementary partitions has no like ordered pairs of integers. For instance, observe that the first subset in the normal and complementary partitions each has the integer 1 but that the other integers are different, i.e., 2, 3, and 4 versus 5, 8, and 10. Some subsets have no identical integers. For instance, compare subsets three, i.e., 8 and 9 versus 3 and 11. This relation between subsets may be more suitably illustrated in tabular form. For the partitions defined in the above Equations 1 and 2 this table takes the form shown below. The table relates the integers to the size of the particular subset in which the particular integer is located in each partition:

| Integer | 1 | 2 | 3 | 4 | 5 | 6 | 7 | 8 | 9 | 10 | 11 | 12 | 13 |
|---|---|---|---|---|---|---|---|---|---|---|---|---|---|
| Normal Partition P | 4 | 4 | 4 | 4 | 3 | 3 | 3 | 2 | 2 | 1 | 1 | 1 | 1 |
| Complementary Partition P′ | 4 | 3 | 2 | 1 | 4 | 3 | 1 | 4 | 1 | 4 | 2 | 3 | 1 |

Using this table the unique identity of each conductor is determined in the following manner. The operator has determined by means of continuity testing that the conductor initially labeled 1 at the near end is connected, via a connecting node, to two other conductors at the remote end. Conductor 1 was originally one of four conductors connected together at the near end. By tabular comparison of the two subsets of the connections of conductor 1 at both ends, conductor 1 is uniquely identified as having the integer 2 assigned to it at the far end. This identification of the conductor is unique because the location of the integer 2 in a four-element subset in the normal partition and in a three-element subset in the complementary partition is also unique. Similarly, if the conductor 5 at the near end was originally in a group of three conductors and is now connected to three conductors at the remote end, then the conductor initially numbered 5 at the near end is the conductor 6 at the far end. This process is continued until all the conductors have been identified.

The operation of the above-disclosed method of conductor identification is dependent upon the existence of complementary partitions which divide a set of integers into complementary subsets. Complementary partitions may be generated for substantially all sets of integers; an exception exists, for example, for a set consisting of two integers. One of the conditions necessary for complementary partitions is that each partition have an equal number of integers and that each partition have at least a corresponding largest subset of a certain number of integers with at least one subset of each smaller size. For example, in the complementary partitions designated by the Equations 1 and 2, each partition has a larger subset each having four integers and corresponding consecutive subsets of decreasing size having three, two and one integers, respectively. A further condition for complementary partitions is that the number of integers of the set of integers $I_1, I_2 I_3 \ldots I_n$ must relate to one of the two following equations:

$$\Delta(m) \leq n \leq \Delta(m+1)-2 \quad (3)$$

or the special case where:

$$n=\Delta(m)-1 \text{ for } m \geq 4 \quad (4)$$

In each case $\Delta m$ is defined as a triangular number in which $\Delta m$ is the sum of the first $m$ positive integers. It is easily seen that the conditions of Equation 4 eliminates, for example, a set where $n=2$.

The derivation of complementary partitions in most instances will be dictated by the Equation 3 which covers all values of $n$ except those covered by the special Equation 4.

Figure 2B:
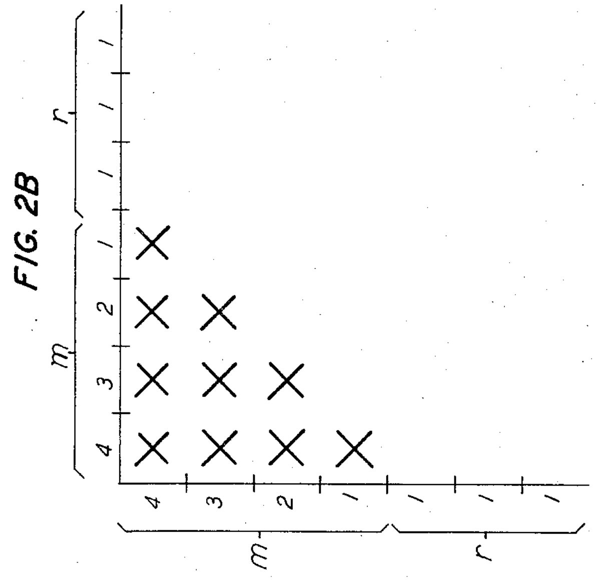
FIGS. 2A, 2B, 2C and 2D are a series of diagrams depicting the steps in deriving a pair of complementary partitions.
Figure 2A:
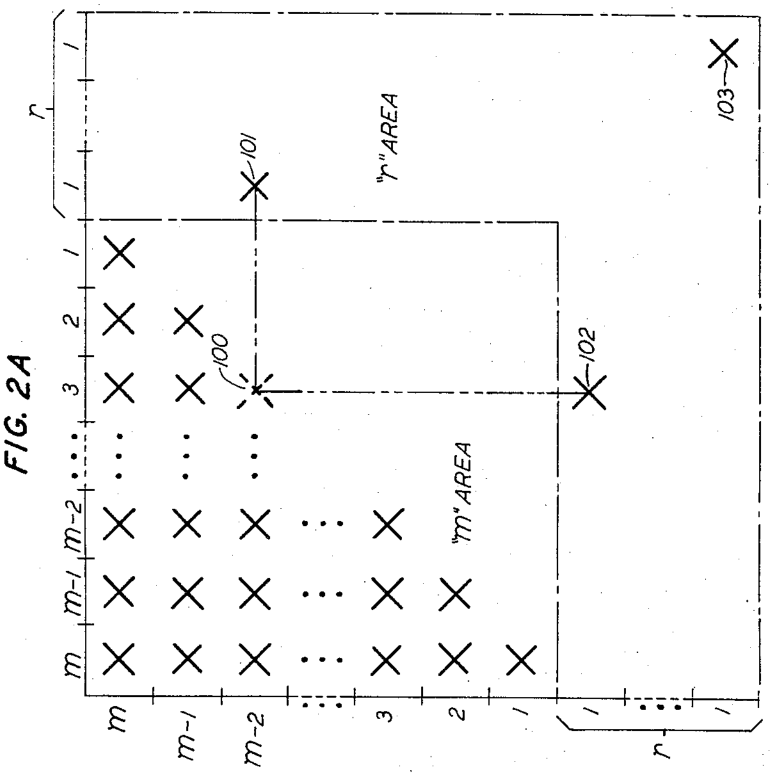

The first step in generating a partition governed by Equation 3 is the plotting of a map such as is shown in generalized form in FIG. 2A. Such a map is constructed having rectangular coordinates with coordinate points along each axis equal to the sum of $m+r$ where $r$ is defined as:

$$r=n-\Delta(m) \qquad (5)$$

The map is divided into an $m$ area and an $r$ area with respect to the controlling rectangular coordinate points. The $r$ area initially represents several open rows and columns in which no points are plotted. The number of coordinate points initially plotted in the $m$ area is equal to the magnitude of the triangular number $\Delta m$ and forms a triangular array. Selected coordinate points in this original triangular array are deleted from the array and projected both vertically and horizontally into the $r$ area of the map. These points to be projected may be selected from any part of the original triangular array except those points plotted in either the first row or column. Each point deleted from the original triangular array is thus replaced by two points in the $r$ area. For example, in projecting the point 100, the original coordinate plotting is deleted from the triangular array and a new point 101 is plotted in the $r$ section in the same row as point 100 and another new point 102 is plotted in the same column as point 100. These new points can appear in any unused row or column. Other selected coordinate points in the triangular array are projected in the $r$ area until the total number of coordinate points mapped is equal in magnitude to the number $n$ of the integers to be partitioned. Under certain conditions where $$r=m-1 \qquad (6)$$

it is necessary to add an additional coordinate point 103 at the intersection of the last row and the last column in the $r$ area to secure a sufficient number of coordinate points to match the number of integers. At the completion of the projections there exist $\Delta m+r$ plotted points, each point having a unique pair of coordinates to define it.

As will be evident hereinafter, the integer groupings of the complementary partitions are determined by placing one of the integers $I_1, I_2 \ldots I_n$ at each one of the plotted coordinate points. The row and column groupings, respectively, indicate the various subsets of both the normal and complementary partitions.

The above-described mapping technique may be more fully described by performing the mapping for a particular set of integers. The number of integers chosen for illustration is $n=13$ which corresponds to the member of conductors shown in the cable in FIG. 1. Applying the value $n=13$ to the Equation 3, the valve of $m$ selected is $m=4$ and a map such as is shown in FIG. 2B is constructed and its triangular coordinate points in the $m$ area are plotted as indicated. Three additional rows and columns comprising the $r$ area are added in accordance with the Equation 5 and labeled with the coordinate value 1 as is typically the case.

Figure 2D:
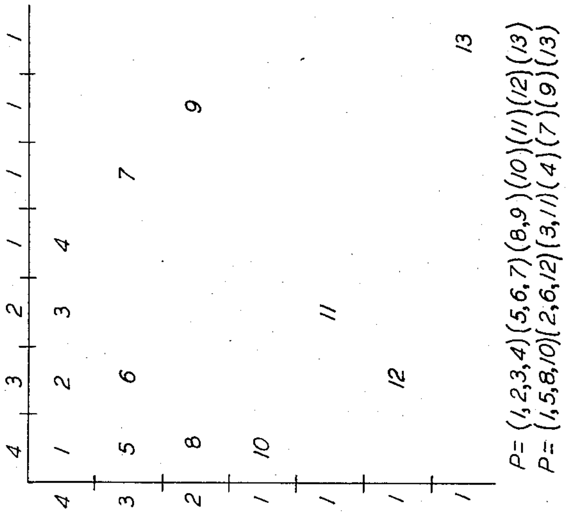
Figure 2C:
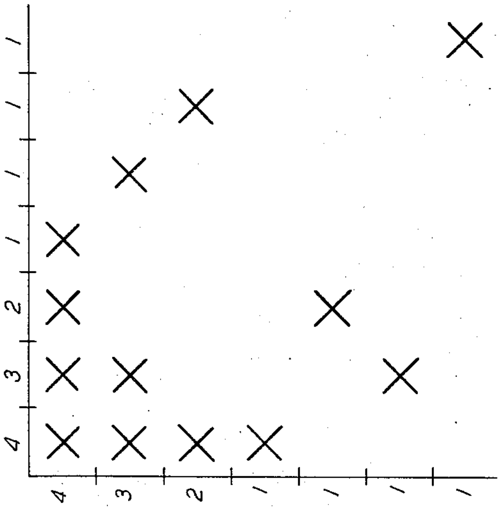

Selected ones of the original coordinate points plotted as shown in FIG. 2B are projected both horizontally and vertically into the $r$ area of the map, as shown in FIG. 2C. Since the value of $r$ satisfies Equation 6 an additional point is plotted in the last row and column of the $r$ area. Now by replacing the plotted coordinate points of FIG. 2C by the set of integers $I_1, I_2 \ldots I_n$ as shown in FIG. 2D, the complementary partitions are determined as indicated by the row and column groupings. These partitions are those set forth in Equations 1 and 2 above. The particular construction illustrated above is valid to generate sets of complementary partitions for all values of $n$ except where $n=\Delta(m)-1$ as defined by Equation 4.

When the number of conductors is such that $$n=\Delta(m)-1$$

as defined by Equation 4, an alternate construction must be used to generate the partitions. This construction is only valid where $m\geq 4$. A generalized map for the generation of complementary partitions is shown in FIG. 3A. Note that the $r$ area which is shown in FIG. 2A is now replaced by an area of rows and columns having the coordinate designations of 1. The rows and columns of this latter area are each equal to $m-3$. A final row and column designated by the coordinates 2 is also added to this area. The $m$ area as compared to FIG. 2A has been reduced by one row and column. As in the previous example the plotted points are projected with the exception of those in the first row and column. In addition, an additional point is plotted in the last row and column with the coordinates (2, 2).

Figure 3B:
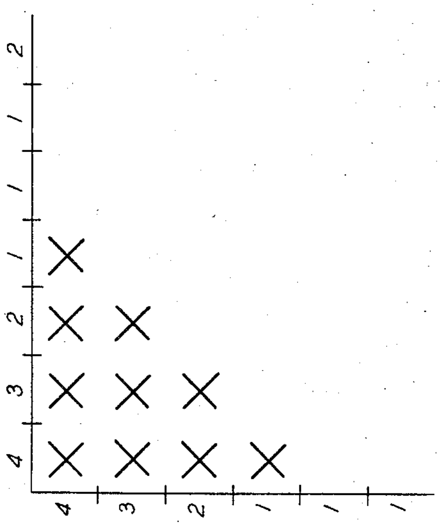
FIGS. 3A, 3B, 3C and 3D are a series of diagrams depicting the steps used in unique circumstances for deriving a pair of complementary partitions.
Figure 3A:
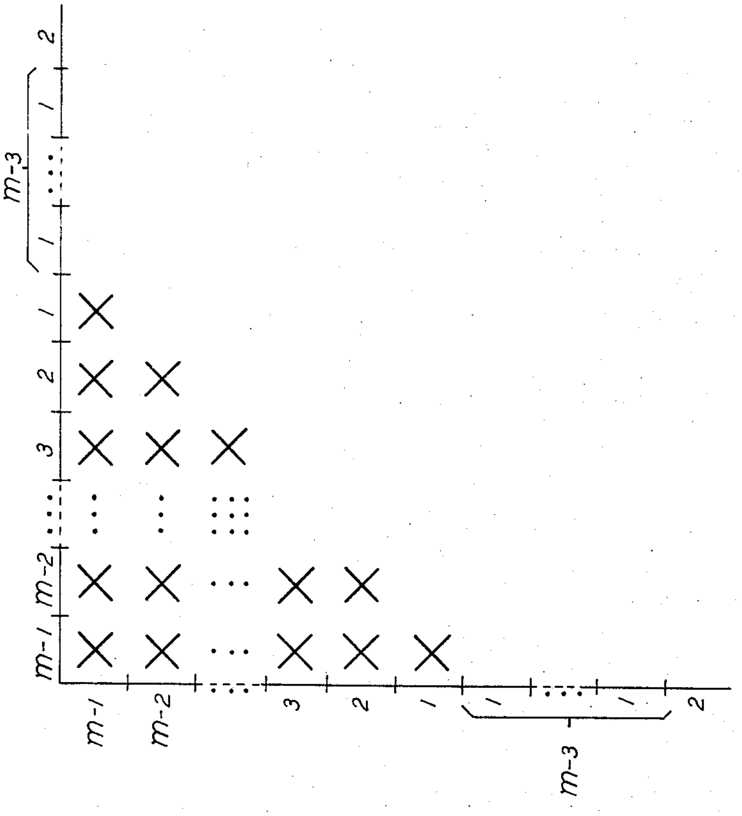
Figure 3D:
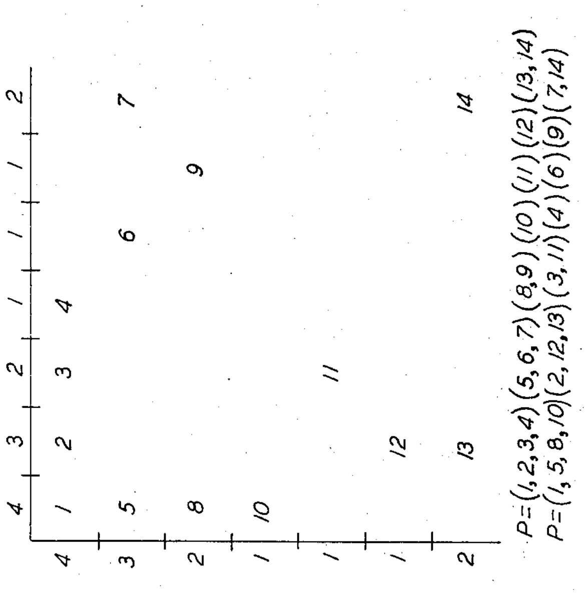
Figure 3C:
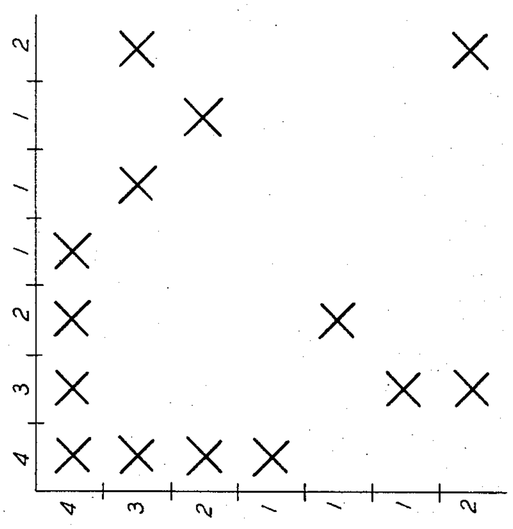

The mapping procedure for a concrete example where $n=14$ (i.e., $m=5$) is illustrated in FIG. 3B, where the triangular array of plotted coordinates is shown. The projection of this array of plotted coordinates into the "$r$-equivalent" projection area is shown in FIG. 3C. Note that the last row and column designated by the coordinates (2, 2) in this construction serves as part of the projection region as well as a construction location to place one additional plotted coordinate. All the points plotted have distinct coordinates and by replacing the plotted coordinates by the integers $I_1, I_2 \ldots I_n$ the complementary partitions are generated for $n=14$ as shown in FIG. 3D.

Although the above invention has been illustrated using a suggested method of generating partitions, it should be realized that partitions may be achieved by heuristic means and other construction methods. It should be further realized that this particular method of conductor identification disclosed may be utilized in a variety of other environments and for other purposes without departing from the spirit and scope of the invention.

What is claimed is:

1. The method of identifying conductors in a multiconductor cable which comprises the steps of establishing unique conductor connection groupings at one end of the cable, identifying these unique conductor connections at the other end of the cable, establishing conductor connection groupings at said other end which are complementary to said unique conductor connection groupings, identifying the complementary connections at said one end of said cable, and comparing the two conductor connection groupings at the two ends of the cable whereby each individual conductor is uniquely identified.

2. The method of identifying conductors in a multiconductor cable according to claim 1 wherein the unique and complementary connection groupings correspond to the normal and complementary partitions of a set of integers equal to the number of conductors, conductor identification being accomplished by comparing each integer subset location in the normal and complementary partitions.

3. The method of identifying conductors in a multiconductor cable containing a set of $n$ conductors comprising the steps of (a) joining selected subsets of the conductors together at one end of the cable, (b) identifying the conductors at the other end of the cable as belonging to the selected subsets, (c) joining the conductors at said other end of the cable according to second subsets which are complementary to the first subsets, (d) identifying the conductors at said one end as belonging to the second complementary subsets, (e) and uniquely identifying each conductor by comparing its subset connections at the ends.

4. The method of identifying individual conductors in a multiconductor cable having $n$ indistinguishable wires comprising the steps of (a) identifying at one end each individual conductor separately with consecutive integers, (b) establishing a pair of complementary partitions for the integers, (c) electrically connecting the conductors together at said one end in correspondence with the integer grouping of the first one of said complementary partitions, (d) determining these connected groups at the remote end of the cable by testing for circuit continuity, (e) numbering these connected groups at said remote end in accordance with the grouped integers of said first partition, (f) electrically connecting the conductors at said remote end in accordance with the partition complementary to said first partition, (g) removing said electrical connections at said one end of said cable, (h) determining at said one end the connected conductor groupings at said remote end by testing for circuit continuity, and (i) comparing subset identifications of the first electrical connections at said one end with the subset identifications of said complementary electrical connections at the remote end to identify each individual conductor as unique to two different subsets.

5. The method of identifying the individual conductors in a multiconductor cable having $n$ indistinguishable conductors comprising the steps of (a) assigning a separate unique integer from a selected set of consecutive integers $I_1, I_2 \ldots I_n$ to each individual conductor, (b) specifying partitions dividing the set of integers $I_1, I_2 \ldots I_n$ into selected subsets such that one partition is complementary to the other normal partition, (c) connecting selected conductors at one end of said cable such that conductors having the assigned integers belonging to a particular subset of said normal partition are connected together, (d) conducting circuit continuity tests at the other end of said cable to determine which conductors are connected together at said one end of said cable and assigning integers to the conductors at said other end such that the subsets of conductors found connected together correspond to the subsets of said normal partition, (e) connecting selected conductors at said other end such that conductors having the assigned integers belonging to a particular subset of said complementary partition are connected together, (f) disconnecting the connections originally made at said one end of said cable and conducting continuity tests to determine which conductors are connected together at said other end of said cable, and (g) identifying the conductors at said other end with the conductors at said one end by comparing the subsets to which each conductor is connected in both the connections conforming to both the normal and complementary partitions.

6. The method of identifying conductors according to claim 5 wherein said continuity tests comprise the steps of (a) applying a signal to a selected conductor with suitable signal generating apparatus at a selected end of said cable, (b) probing all the other conductors at said selected end of the cable with suitable signal receving apparatus, and (c) identifying those conductors on which signals are received as being connected to said selected conductor at the remote end of said cable.

7. The method of identifying conductors according to claim 5 wherein the specifying of partitions for the set of integers $I_1, I_2 \ldots I_n$ where the value $n$ satisfies the equation $\Delta(m) \leq n \leq \Delta(m+1)-2$ comprises the steps of (a) constructing a map with rectangular coordinates having $m+r$ distinct points along each coordinate axis where $r=n-\Delta(m)$ and creating an $m$ area and an $r$ area for plotting purposes, (b) plotting a triangular array of points in said $m$ area, (c) deleting plotted points in said $m$ area and projecting said deleted points both vertically and horizontally into said $r$ area and if necessary adding a point in the $r$ area so that the total number of points plotted equals the number of integers $n$, and (d) inserting the integers at the coordinates of the plotted points to determine the subsets of the normal and complementary partitions.

8. The method of identifying conductors according to claim 5 wherein the specifying of partitions for the set of integers $I_1, I_2 \ldots I_n$ where the value of $n$ satisfies the equation $n=\Delta(m)-1$ for $m \geq 4$ comprises the steps of (a) constructing a map with rectangular coordinates having $2m-3$ distinct points along each coordinate axis, (b) plotting a triangular array of coordinate points on said map, (c) deleting selected ones of these plotted points and projecting said deleted points both vertically and horizontally into the region with coordinates at a distance from the origin greater than $m-2$ and adding an additional plotted point so that the total number of points plotted equals the number of integers $n$, and (d) inserting the integers at the coordinates of the plotted points to determine the subsets of the normal and complementary partitions.

References Cited

UNITED STATES PATENTS

| | | | |
|---|---|---|---|
| 2,133,384 | 10/1938 | Fisher et al. | 324—66 |
| 2,806,995 | 9/1957 | Meanley | 324—66 |
| 3,252,088 | 5/1966 | Palmer | 324—66 |
| 3,287,509 | 11/1966 | Bohnenblust | 324—66 XR |
| 3,288,945 | 11/1966 | McNair et al. | 324—66 XR |

RUDOLPH V. ROLINEC, *Primary Examiner.*

WALTER CARLSON, *Examiner.*

G. R. STRECKER, *Assistant Examiner.*